(12) United States Patent
Berenbaum et al.

(10) Patent No.: US 7,966,379 B2
(45) Date of Patent: Jun. 21, 2011

(54) IN-BAND EVENT POLLING

(75) Inventors: Alan D. Berenbaum, New York, NY (US); Raphael Weiss, Plainview, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 1038 days.

(21) Appl. No.: 11/469,267

(22) Filed: Aug. 31, 2006

(65) Prior Publication Data
US 2008/0005379 A1 Jan. 3, 2008

Related U.S. Application Data

(60) Provisional application No. 60/798,284, filed on May 5, 2006.

(51) Int. Cl.
*G06F 15/16* (2006.01)
(52) U.S. Cl. ........ 709/208; 709/217; 709/248; 709/213; 710/15; 710/105; 719/318; 719/321; 714/E11.023; 714/48
(58) Field of Classification Search .................. 709/208, 709/217, 248, 213; 719/318, 321; 714/E11.023, 714/48; 710/15, 105
See application file for complete search history.

(56) References Cited

U.S. PATENT DOCUMENTS

| | | | |
|---|---|---|---|
| 5,793,994 A * | 8/1998 | Mitchell et al. | 710/105 |
| 5,961,651 A | 10/1999 | Gittins et al. | |
| 5,964,837 A | 10/1999 | Chao et al. | |
| 6,170,005 B1 * | 1/2001 | Meandzija | 709/217 |
| 6,675,243 B1 * | 1/2004 | Bastiani et al. | 710/105 |
| 6,842,628 B1 | 1/2005 | Arnold et al. | |
| 6,934,955 B2 | 8/2005 | Nickum | |
| 7,058,957 B1 | 6/2006 | Nguyen | |
| 7,069,309 B1 | 6/2006 | Dodrill et al. | |
| 2002/0026502 A1 * | 2/2002 | Phillips et al. | 709/219 |
| 2002/0120803 A1 * | 8/2002 | Porterfield | 710/305 |
| 2004/0049572 A1 | 3/2004 | Yamamoto et al. | |
| 2005/0038791 A1 | 2/2005 | Ven | |
| 2005/0097569 A1 | 5/2005 | Chandrasekaran | |
| 2006/0218532 A1 | 9/2006 | Cordella et al. | |
| 2006/0271676 A1 | 11/2006 | Talayco et al. | |
| 2007/0006236 A1 * | 1/2007 | Durham et al. | 719/318 |
| 2007/0061634 A1 * | 3/2007 | Marisetty et al. | 714/48 |
| 2007/0186021 A1 | 8/2007 | Drexler et al. | |

* cited by examiner

*Primary Examiner* — Kyung-Hye Shin
(74) *Attorney, Agent, or Firm* — Meyertons Hood Kivlin Kowert & Goetzel, P.C.; Jeffrey C. Hood

(57) ABSTRACT

In-band event polling mechanism. A master device may initiate a polling transaction to poll at least a subset of a plurality of slave devices for event information. In response to the polling transaction, at least one of the subset of slave devices may transmit event information to the master device. The event information may correspond to at least one of a plurality of asynchronous event types. If the event type associated with the received event information is an event notification for an embedded processor of the master device, the master device may forward the event information to the embedded processor. Otherwise, if the event type associated with the received event information is an event notification for a device external to the master device (e.g., a host processor), the master device may translate the event information to a protocol associated with the event type and forward the event information to the external device.

17 Claims, 6 Drawing Sheets

IN-BAND EVENT POLLING

PRIORITY CLAIM

This application claims benefit of priority of U.S. provisional application Ser. No. 60/798,284 titled "In-Band Interrupt Polling", filed May 5, 2006.

BACKGROUND OF THE INVENTION

1. Field of the Invention

The present invention relates generally to data transfer methodologies, more particularly, to an event polling mechanism.

2. Description of the Related Art

In typical computer systems, peripheral devices can signal asynchronous events upstream by various protocols. Each protocol typically requires at least one dedicated pin on the peripheral devices and at least one dedicated pin on the master device. On very low-cost devices, dedicating a pin for asynchronous event signal service will typically incur extra costs, or may limit the potential functionality of the device.

Systems that forward DMA requests to a different protocol typically use pins dedicated to DMA requests. In LPC DMA systems, a single LDRQ# pin usually provides up to eight DMA requests from one slave device with various peripherals, but conveys no other type of synchronous or asynchronous information (events). Each LDRQ# is typically a peer-to-peer connection. If more than one slave device contains a DMA peripheral, each device usually has to use a separate LDRQ# pin on the master device. For PC/PCI DMA, each DMA request is signaled on individual dedicated pins requiring up to eight dedicated pins on each master and slave device.

Systems that implement serial interrupt request (SIRQ) typically provide a mechanism for conveying and sharing multiple interrupts requests between multiple slaves devices via open drain time division multiplexing (TDM). However, SIRQ does not permit other (non-IRQ) asynchronous events to share the pin or protocol.

Systems that rely on software polling suffer both from long and possibly unpredictable latency in responding to event service requests, as well as putting what may be an undesirable load on the software in generating the poll requests.

Many other problems and disadvantages of the prior art will become apparent to one skilled in the art after comparing such prior art with the present invention as described herein.

SUMMARY OF THE INVENTION

Various embodiments are disclosed of a method and apparatus for implementing an in-band event polling mechanism in a system including a master device and a plurality of slave devices. The master device may initiate a polling transaction to poll at least a subset of the plurality of slave devices for event information. In response to the polling transaction, at least one of the subset of slave devices may transmit event information to the master device. The event information may correspond to at least one of a plurality of asynchronous event types. For example, the event information may correspond to at least one of a DMA request, a SIRQ, and an interrupt for an embedded controller of the master device. The master device may receive the event information and determine where to forward the received event information based on the at least one event type associated with the received event information. In various embodiments, the master device may execute the event polling transaction and the slave devices may transmit event information corresponding to a plurality of asynchronous event types via a single bus and a single protocol.

In various embodiments, if the event type associated with the received event information is an event notification for the embedded processor of the master device, an event polling controller of the master device may forward the received event information to the embedded processor. Otherwise, if the event type associated with the received event information is an event notification for a device external to the master device (e.g., a host processor), the master device may translate the received event information to a protocol associated with the event type and forward the event information to the external device.

In one embodiment, if the event type associated with the received event information is a SIRQ, the master device may translate the received event information to a protocol associated with SIRQ and forward the event information to a device external the master device. If the event type associated with the received event information is a DMA request, the master device may translate the received event information to a protocol associated with DMA and forward the event information to a device external the master device.

In various embodiments, the master device may include a mapping mechanism for reading the received event information and determining at least one event type associated with the received event information. Furthermore, in some embodiments, the received event information may include mapping information embedded in the event message. The mapping information may indicate at least one event type associated with the received event information.

Figure 1:
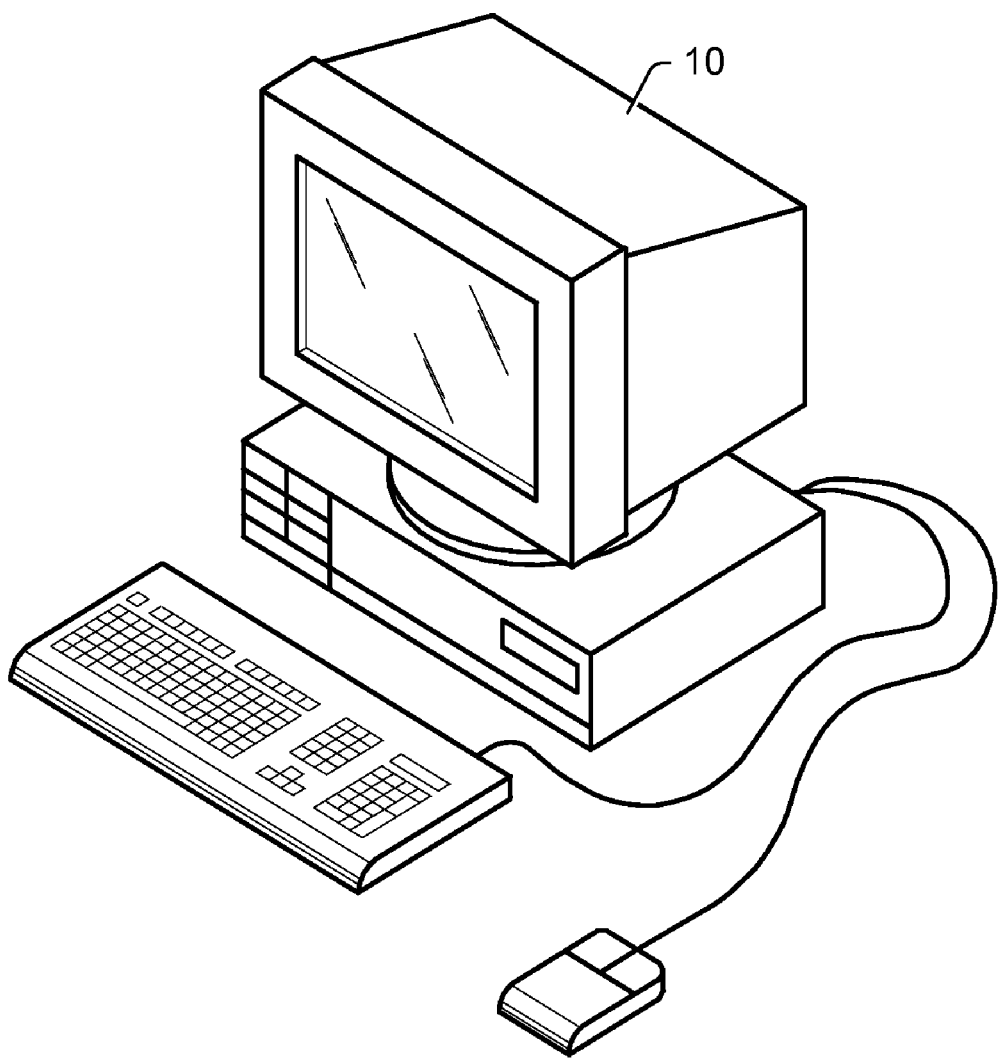
FIG. 1 is a drawing of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

FIG. 1 is a drawing of one embodiment of a computer system 10. Computer system 10 may be any of various types of computing or processing systems, including a personal computer system (PC), mainframe computer system, server system including a plurality of server blades, workstation, network appliance, Internet appliance, personal digital assistant (PDA), or other device or combinations of devices. In general, the term "computer system" can be broadly defined to encompass any device (or combination of devices) having at least one processor that executes instructions from a memory medium.

Computer system 10 may include at least one processor, which may be any of various types, including an x86 processor, e.g., a Pentium™ class, a PowerPC™ processor, a CPU from the SPARC™ family of RISC processors, as well as others. Also, computer system 10 may include one or more memory subsystems (e.g., Dynamic Random Access Memory (DRAM) devices). The memory subsystems may collectively form the main memory of computer system 10 from which programs primarily execute. The main memory may further store user applications and driver software programs. Computer system 10 may include a motherboard as well as various other components.

Serialized Secondary Bus

Figure 2:
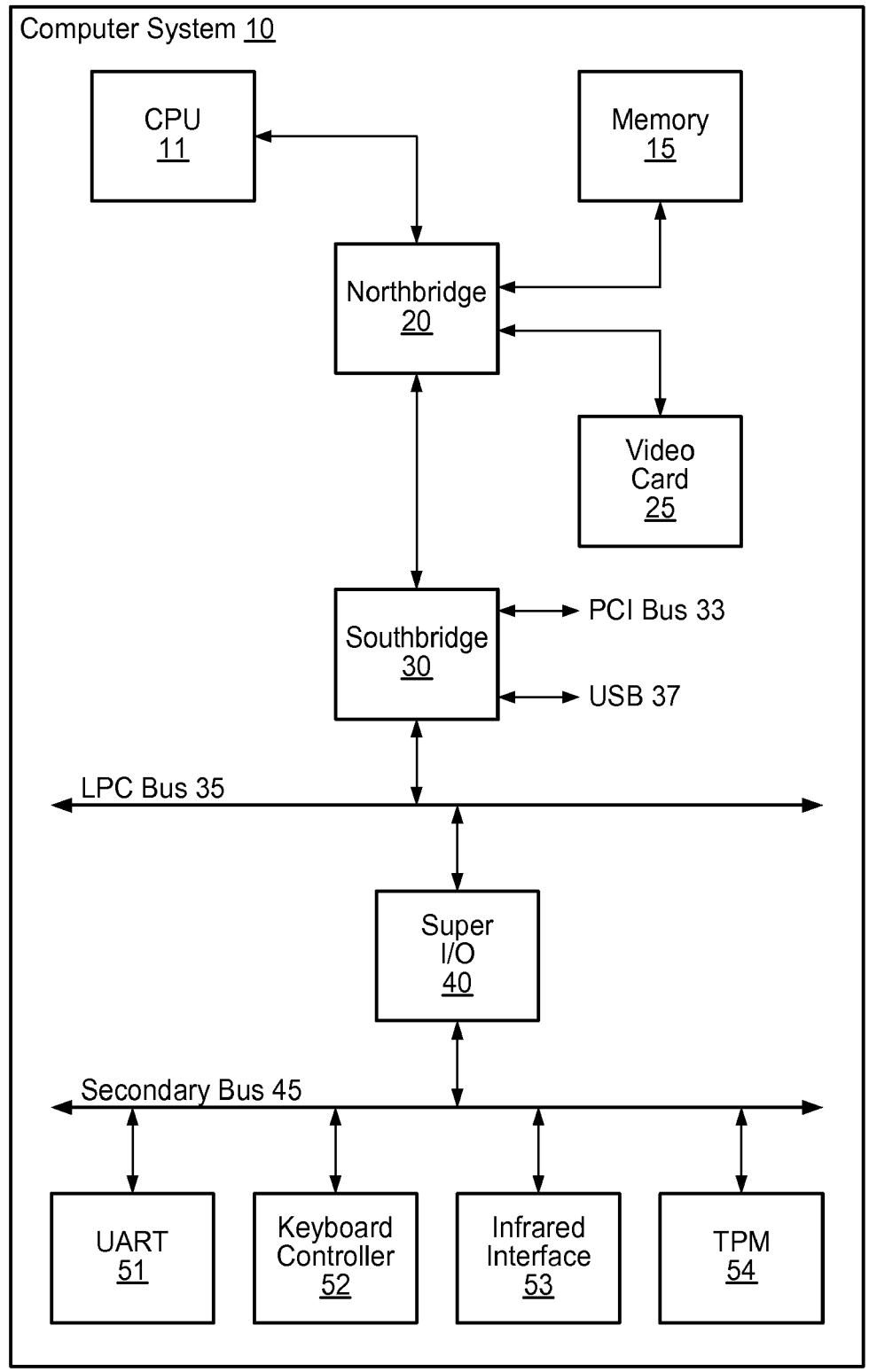
FIG. 2 is a block diagram of one embodiment of the computer system of FIG. 1.

FIG. 2 is a block diagram of one embodiment of computer system 10. As one example, FIG. 2 illustrates the components present on a motherboard of computer system 10. Computer system 10 may include a CPU 11, a northbridge 20, a main memory 15, a video card 25, and a southbridge 30. The northbridge 20 and the southbridge 30 may form the core logic chipset on the motherboard of computer system 10. It is noted that computer system 10 may include other types of logic chipsets. Logic chipsets may be defined as specialized motherboard chips on computers or expansion cards that have various characteristics and perform a variety of functions, e.g., bus bridge functions. The northbridge 20 may handle communications between at least the CPU 11, the main memory 15, and the southbridge 30. The southbridge 30 is connected to the northbridge 20 and may handle communications to and from a variety of peripheral or slave devices connected to several buses. As illustrated in the embodiment of FIG. 2, the southbridge 30 may include interfaces to at least one of the following buses: PCI bus 33, low pin count (LPC) bus 35, and USB 37. It is noted that each bus may connect to one or more devices. It is further noted that in other embodiments the southbridge 30 may interface with additional buses.

LPC bus 35 is a serial bus used to connect one or more slave devices in a computer system, as defined in the LPC interface specification version 1.1 and other versions thereof. LPC bus 35 typically includes up to thirteen signal lines; seven of the signals are required and 6 are optional. LPC bus 35 is often used in place of an industry standard architecture (ISA) bus, because it requires less signal lines.

In some implementations, a super I/O chip 40 may interface with LPC bus 35. Super I/O chips may be part of a class of I/O controller integrated circuits that combine interfaces to a variety of devices, typically low bandwidth devices, and other bus management functions in a single chip. As shown in FIG. 2, in one specific implementation, super I/O chip 40 may support several slave devices, such as a universal asynchronous receiver-transmitter (UART) 51, a keyboard controller 52, an infrared device 53, and a trusted platform module (TPM) 54. It is noted, however, that in other implementations, super I/O chip 40 may support other low bandwidth devices, e.g., a thermal sensor and a floppy drive controller. It is further noted that in some embodiments computer system 10 may include other types of bus controllers having similar functionality as super I/O chip 40.

In various embodiments, the super I/O chip 40 may include an interface for a serialized secondary bus 45. The secondary bus 45 may support all communications, including data transfer, clocking, interrupt, specialized broadcasts, and DMA requests, between super I/O chip 40 and slave devices 51-54 on three wires. Bus 45 may also support forwarding of LPC bus transfers from super I/O chip 40 to one or more of the slave devices 51-54, e.g., DMA cycles and TPM cycles on the LPC bus 35. It is noted, however, that in other embodiments bus 45 may include one or two signal lines, or at least may use less signal lines compared to LPC bus 35.

Prior art computer systems use other buses, e.g., LPC bus 35, to connect the southbridge 30 to certain slave devices, such as low bandwidth devices 51-54. However, using an LPC bus introduces some routing constraints, because space on motherboards is usually very limited and the LPC bus typically requires seven to thirteen signal lines.

In one embodiment of the invention, bus 45 is used in place of at least a portion of the LPC bus 35, as shown. Bus 45 may be a "reduced pin count" bus relative to LPC bus 35. Connecting devices 51-54 via bus 45 eliminates some of the routing constraints and congestion associated with using buses such as the LPC bus 35, because bus 45 requires less signal lines than the LPC bus 35, e.g., in some implementations bus 45 only requires three signal lines. The reduced pin count may reduce package costs and may result in lower power due to fewer switching signals. Also, moving some devices to bus 45 may reduce the loading on the LPC bus 35, which may improve the reliability of the LPC bus 35. Furthermore, as shown in the embodiment of FIG. 2, by bridging the LPC bus 35, bus 45 may extend the reach of the LPC bus 35 so that peripherals may be placed further from the southbridge 30.

Figure 3:
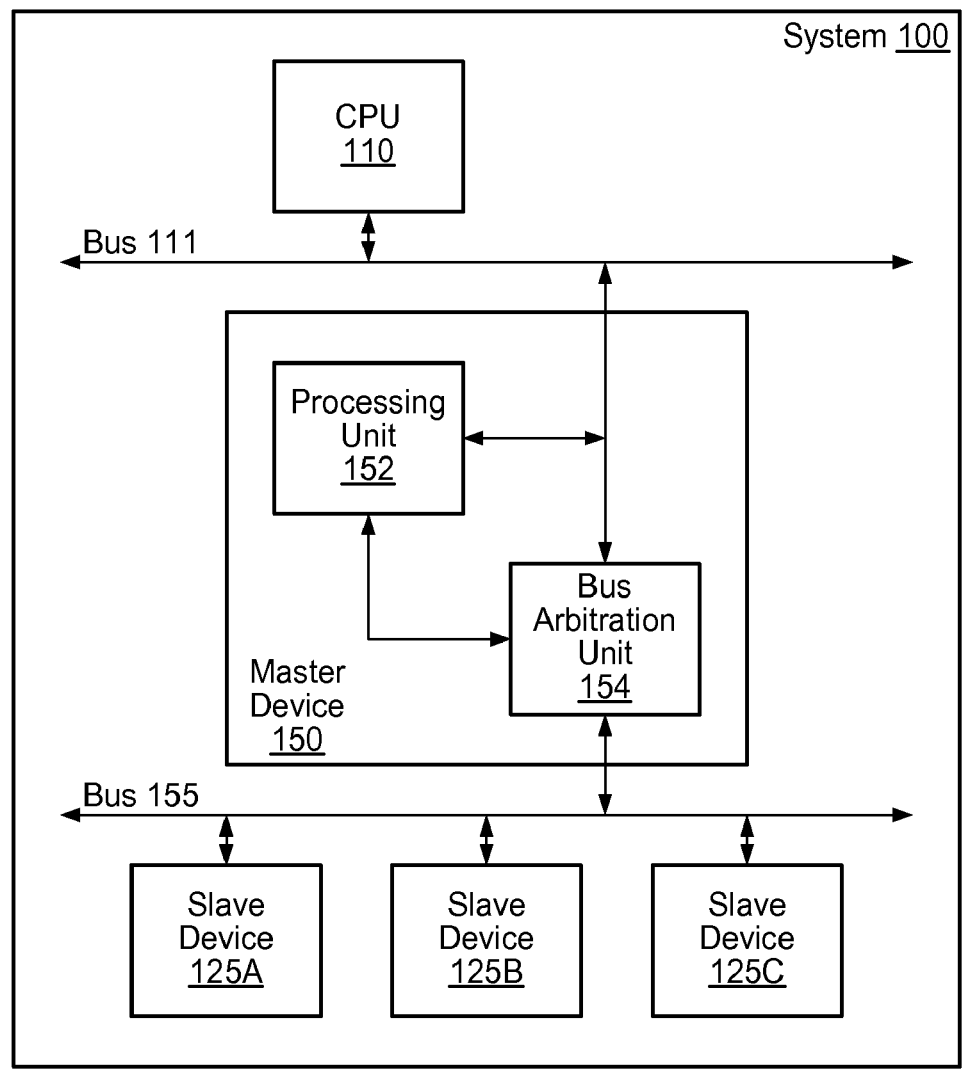
FIG. 3 is a block diagram of one embodiment of a system including a master device and a plurality of slave devices.

FIG. 3 is a block diagram of one embodiment of a system 100. It is noted that in one embodiment, system 100 may be illustrative of computer system 10 of FIG. 1 and FIG. 2. However, it is noted that system 100 may be any of various types of computing or processing systems, including a personal computer system (PC), mainframe computer system, workstation, server blade, network appliance, system-on-a-chip (SoC), Internet appliance, personal digital assistant (PDA), television system, audio systems, grid computing system, or other device or combinations of devices, which in some instances form a network. For instance, in some embodiments, master device 150 and slave devices 125 may collectively form a network, e.g., a local area network (LAN) or a wireless network. In other embodiments, system 100 may be a circuit board or motherboard of a computer system, e.g., a laptop computer.

In one specific implementation, system 100 is formed as illustrated in the embodiment of FIG. 3. System 100 may include a CPU 110, a bus 111, a master device 150, slave devices 125A-C, and a bus 155. CPU 110 may be connected to master device 150 through bus 111, and master device 150 may be connected to the slave devices 125 via bus 155. System 100 may further include at least an event polling mechanism, as will be described further below with reference to FIGS. 4-7B. In some embodiments, master device 150 may communicate with slave device 125 through the use of a bus protocol to perform at least event polling operations. It is noted that in other embodiments master device 150 may communicate with slave device 125 through the use of a wireless protocol.

System 100 may include a variety of slave devices, usually low bandwidth devices, such as an infrared interface, a universal asynchronous receiver-transmitter (UART), a keyboard controller, a parallel port, a serial port, a mouse interface, a thermal sensor, and floppy disk controller, among others. In one specific implementation, one of the slave devices 125 of system 100 may be a TPM, e.g., TPM 54 of FIG. 2. It is noted, however, that in other implementations system 100 may include other kinds of slave devices with different functionality. Also, in some embodiments, at least a subset of the slave devices may represent nodes on a network. It is further noted that system 100 may include any number of slave devices 125.

In various embodiments, bus 111 may be LPC bus 35, and bus 155 may be serialized secondary bus 45 described above with reference to FIG. 2. In these embodiments, bus 155 may be a "reduced pin count" bus relative to the LPC bus, e.g., a three-wire bus. It is noted, however, that in other embodiments bus 111 may be another type of bus, for example, an ISA or EISA bus. It is further noted that bus 155 may be another type of bus besides a three-wire bus, e.g., a two-wire bus or a four-wire bus, and may have various characteristics. In some embodiments, master device 150 may be configured to operate as a bus controller or I/O controller. For instance, master device may be a super I/O chip 40, as described above with reference to FIG. 2.

As illustrated in the embodiment of FIG. 3, master device 150 may includes a processing unit 152 and a bus arbitration unit 154. Processing unit 152 may initiate bus transactions intended for the slave devices 125, and bus arbitration unit 154 may arbitrate ownership of bus 155 between processing unit 152 and bus 111, as will be described further below. For example, processing unit 152 of master device 150 may initiate an event polling mechanism functions within system 100.

It should be noted that the components described with reference to FIGS. 2 and 3 are meant to be exemplary only, and are not intended to limit the invention to any specific set of components or configurations. For example, in various embodiments, one or more of the components described may be omitted, combined, modified, or additional components included, as desired. For instance, in some embodiments, master device 150 may not include an embedded processor, e.g., processing unit 152. Furthermore, it is noted that the components of computer system 10 or system 100 may be implemented in software and/or hardware.

During operation, CPU 110 may initiate one or more bus transactions intended for slave devices 125. CPU 110 may transmit the bus transactions to master device 150 (e.g., an I/O controller) over bus 111 (e.g., LPC bus 35). Master device 150 may translate and forward the bus transactions corresponding to bus 111 (e.g., LPC bus transactions) to one or more of the slave devices 125 over bus 155. For instance, if bus 111 is an LPC bus and bus 155 is a three-wire bus, master device 150 translates the LPC bus transactions into the protocol corresponding to the three-wire bus, and then forwards the bus transactions to one or more of the slave devices 125.

Processing unit 152 may also initiate bus transactions intended for slave devices 125. For example, in one specific implementation, processing unit 152 is an embedded microcontroller of master device 150, which manages bus transactions for slave devices 125 to off-load some tasks from CPU 110. In this manner, this architecture helps to distribute the processing needs within system 100 effectively, in addition to solving some routing challenges.

Since at any given time both processing unit 152 and bus 111 may attempt to transmit signals to one or more of the slave devices 125, bus arbitration unit 154 may arbitrate ownership of bus 155. In some embodiments, bus arbitration unit 154 may assign ownership of bus 155 based on the priority of the transaction. It is noted, however, that in other embodiments bus arbitration unit 154 may arbitrate ownership of bus 155 by other methods, e.g., LPC bus transactions may always have the highest priority, or bus ownership may alternate between bus 111 and processing unit 152. In response to receiving a bus transaction from either bus 111 or processing unit 152, one or more of the slave devices 125 performs an operation corresponding to the bus transaction, e.g., an event polling operation or a temperature sensing function.

It is noted that some slave devices may communicate with master device 150 and CPU 110, for example, after performing a designated operation. Therefore, in various embodiments, master device 150 may also be configured to translate and forward bus transactions received from the slave devices 125 to bus 111.

In-Band Event Polling

Figure 4:
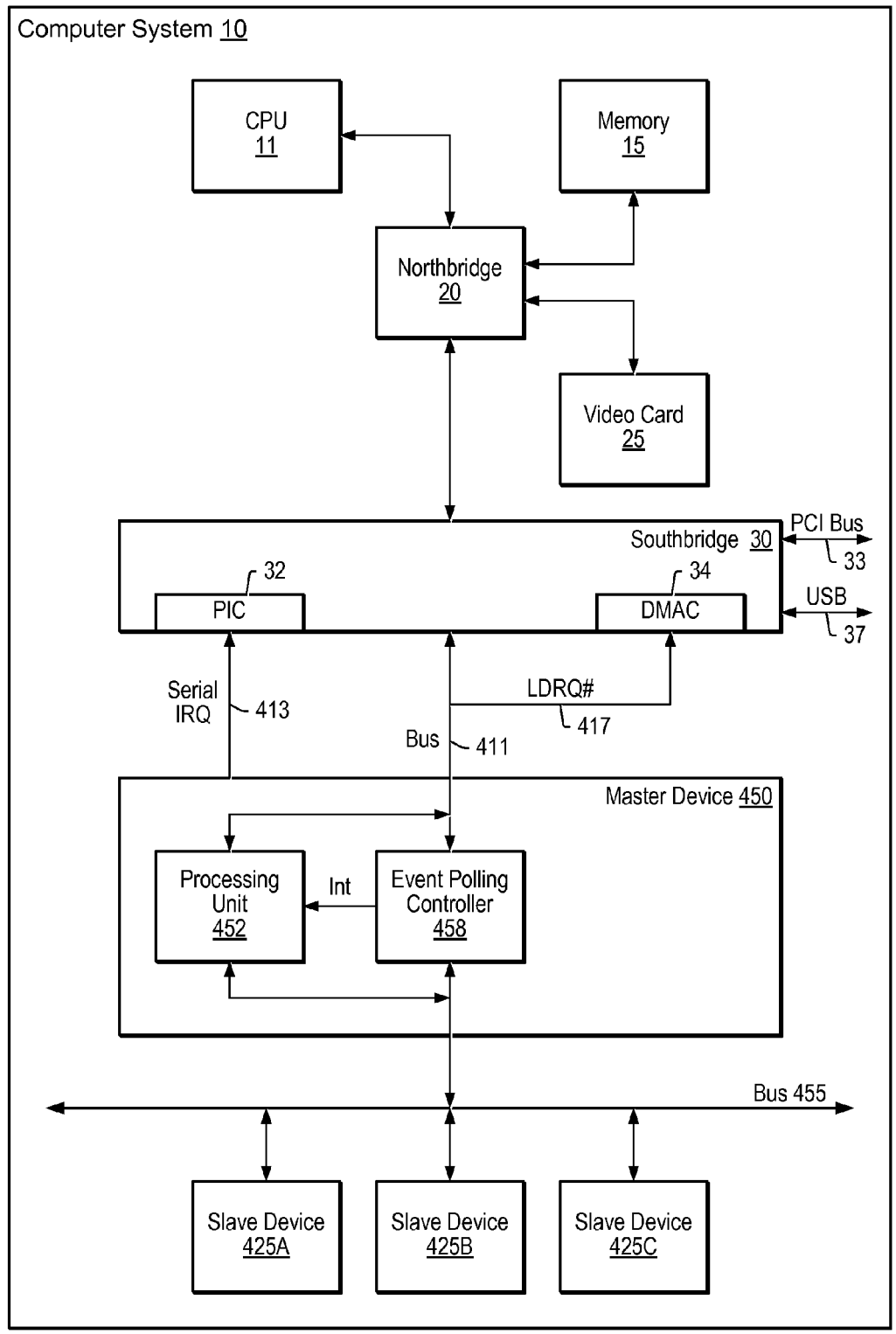
FIG. 4 is a block diagram of one embodiment of a computer system including an in-band event polling mechanism.

FIG. 4 is a block diagram of one embodiment of a computer system 400 including an in-band event polling mechanism. Specifically, computer system 400 includes a master device 450 connected to a plurality of slave devices 425A-C (or peripherals) via a bus 455. Computer system 400 is configured to implement the in-band event polling mechanism for communicating information about asynchronous events in slave devices 425 to master device 450. It is noted that in various embodiments computer system 400 may be a specific implementation of system 10 of FIG. 2 or system 100 of FIG. 3. In these embodiments, master device 450 may be master device 150 (e.g., a Super I/O controller), and slave devices 425 may be slave devices 125 (e.g., low bandwidth devices such as an infrared interface and a UART), as described above with reference to FIGS. 2 and 3. It is noted, however, that in other embodiments computer system 400 may be other types of computing and processing systems with various characteristics and which includes a master device and a plurality of slave devices for implementing the in-band event polling mechanism.

In one embodiment, bus 455 may be an extension bus that has a reduced pin count relative to an LPC bus. For instance, bus 455 may be bus 45 of FIG. 2 or bus 155 of FIG. 3, as described above. In one specific implementation, bus 455 may be a three-wire bus. It is noted, however, that in other embodiments bus 455 may have other characteristics, e.g., as described above with reference to FIGS. 2 and 3. In one embodiment, bus 411 may be an LPC bus. It is noted, however, that in other embodiments 455 may be another type of bus, e.g., an ISA bus.

As described above, in typical computer systems, slave devices may signal asynchronous events upsteam by various protocols. Each protocol typically requires at least one dedicated pin on the slave devices and at least one dedicated pin on the master device. On very low-cost devices, dedicating a pin for asynchronous event signal service will typically incur extra costs, or may limit the potential functionality of the device.

In various embodiments, the in-band event polling mechanism may provide seamless support of upstream asynchronous protocols without adding any additional pins between master device 450 and slave devices 425. As shown in FIG. 4, the in-band event polling mechanism may communicate all information about the asynchronous events in slave devices 425 to master device 450 via polling transactions on the same bus (i.e., bus 455) used to send synchronous data transactions between master device 450 and slave devices 425. For instance, some examples of synchronous data transactions are host processor I/O read/writes of registers in slave devices.

One generic example of an asynchronous event is an interrupt. Interrupts usually require at least one dedicated signal to alert a processor that a peripheral has an asynchronous event. The signal provides the means both for alerting the processor that some event requires service, as well as a means of annulling the event when the processor has serviced it.

A second generic example of an asynchronous event is a direct memory access (DMA) request. A DMA Request usually requires at least one dedicated signal to alert a DMA controller (DMAC) that a peripheral has a DMA request. The signal provides the means both for alerting and a means of annulling a request to the DMAC.

The in-band event polling mechanism may allow slave devices 425 to communicate interrupts to an embedded processor (e.g., processing unit 452) in master device 450 as well as convey other asynchronous events (e.g., SIRQ, DMA) from slave devices 425 to master device 450. These other asynchronous events are first provided to master device 450 via bus 455, which then forwards the events upstream via the corresponding protocols.

Typical systems that forward DMA requests to a different protocol use pins dedicated to DMA requests. In LPC DMA, a single LDRQ# pin usually provides up to eight DMA requests from one slave device with various peripherals, but conveys no other type of synchronous or asynchronous information (events). Each LDRQ# is typically a peer-to-peer connection. If more then one slave device contains a DMA peripheral, each device usually has to use a separate LDRQ# pin on the master device. For PC/PCI DMA, each DMA request is signaled on individual dedicated pins requiring up to eight dedicated pins on each master device and slave device.

Also, typical systems that implement SIRQ provide a mechanism for conveying and sharing multiple interrupts requests between multiple slaves devices via open drain time division multiplexing (TDM). However, SIRQ does not permit other (non-IRQ) asynchronous events to share the pin or protocol.

The in-band event polling mechanism may convey a least four distinct types of asynchronous events sourced from multiples slave devices 425, through one master device 450, targeting multiple destinations (e.g., processing unit 452 or CPU 11), and conveyed to various destinations via distinct protocols (e.g., DMA, SIRQ). Furthermore, this may be accomplished without adding sideband signal pins between master and slave devices not used for synchronous communication. It is noted, however, that in other embodiments the in-band event polling mechanism may convey any number of distinct types of asynchronous events sourced from one or more slave devices, e.g., two or six distinct types of asynchronous events.

The in-band event polling mechanism may provide a polling cycle added in addition to standard read data and write data cycles on the data bus. After initiating a start cycle announcing the beginning of a poll, each of the slave devices 425 may in turn signal whether or not they have an asynchronous event that requires servicing.

The in-band event polling mechanism may convey multiple types of asynchronous events on a single bus via one protocol, for part or all of the path, from the particular slave device 425 to a specific type of asynchronous event protocol controller. In the cases where in-band event polling mechanism routes a specific type of asynchronous event only part of the way, the asynchronous event may be translated in the master device 450, e.g., translated to a prior art asynchronous event protocol, for example SIRQ, and forwarded to a prior art protocol controller (e.g., programmable interrupt controller (PIC) 32). The in-band event polling protocol may forward information seamlessly to/from the prior art asynchronous event protocol.

It should be noted that the components described with reference to FIG. 4 are meant to be exemplary only, and are not intended to limit the invention to any specific set of components or configurations. For example, in various embodiments, one or more of the components described may be omitted, combined, modified, or additional components included, as desired. For instance, in some embodiments, master device 450 may be connected to other devices instead of or in addition to southbridge 30. Also, in other embodiments, the in-band event polling mechanism may be implemented in other bus architectures that facility communications between master and slave devices, and is designed to transmit event information corresponding to a plurality of event types via a single bus and a single protocol.

Figure 5:
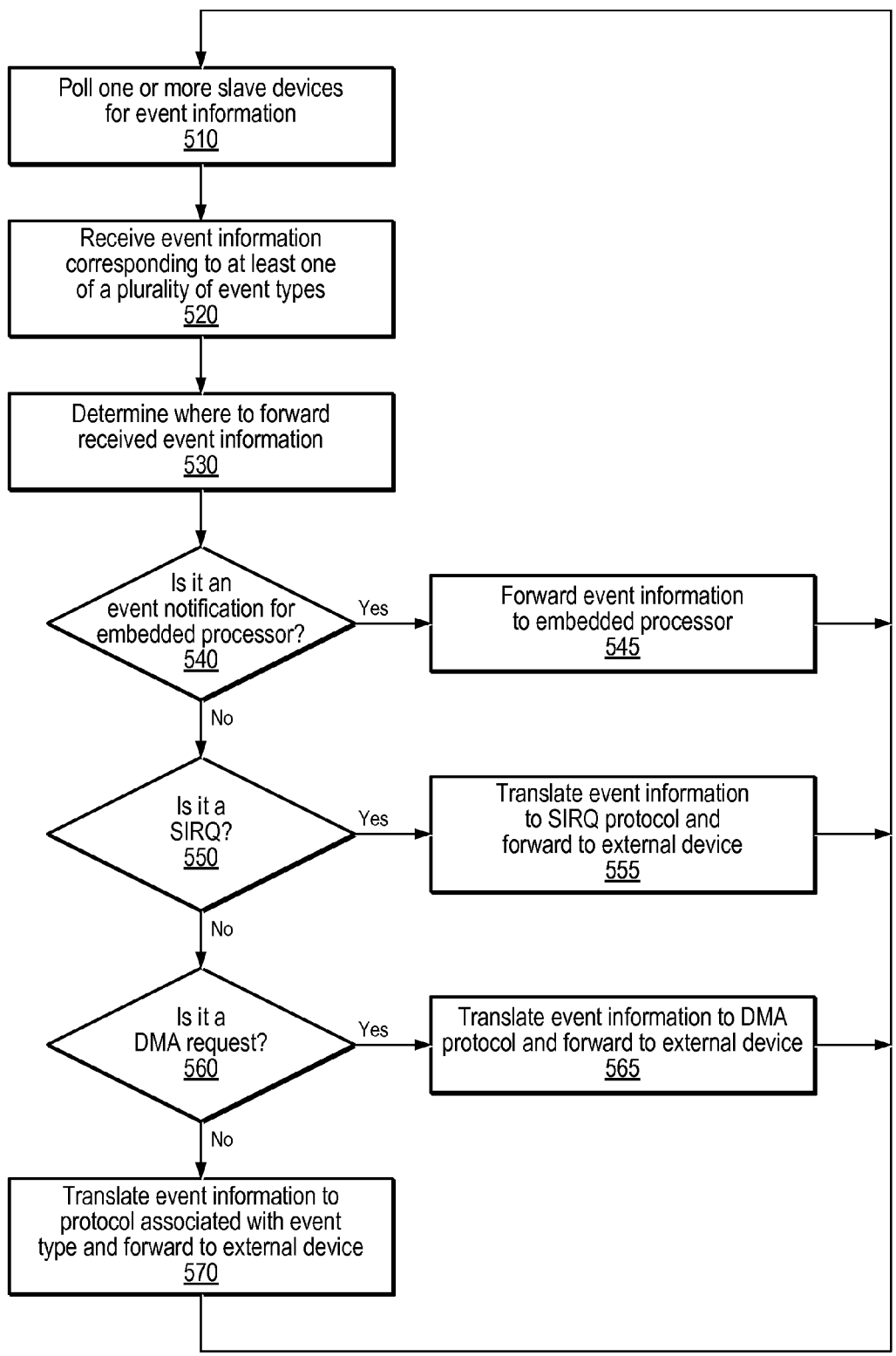
FIG. 5 is a flow diagram illustrating a method for implementing the in-band event polling mechanism, according to one embodiment.

FIG. 5 is a flow diagram illustrating a method for implementing the in-band event polling mechanism, according to one embodiment. It should be noted that in various embodiments, some of the steps shown may be performed concurrently, in a different order than shown, or omitted. Additional steps may also be performed as desired.

Referring collectively to the embodiments illustrated in FIG. 5 and FIG. 4, during operation, master device 450 may initiate a polling transaction to poll one or more of slave devices 425 for event information (block 510). In response to the polling transaction, one or more of slave device 425 may transmit event information to master device 450 (block 520). In one embodiment, the slave devices 425 may transmit the vent information via one or more data packets. The event information may correspond to at least one of a plurality of asynchronous event types, e.g., at least one of an interrupt for the embedded processor, a SIRQ, and a DMA request. It is noted, however, that the received event information may correspond to other types of asynchronous events.

After receiving the event information from slave devices 425, master device 450 may determine where to forward the received event information based on the at least one event type associated with the received event information (block 530). In various embodiments, event polling controller 458 of master device 450 may determine where to forward the received event information. In some cases, the received event transmission from slave devices 425 may comprise one or more packets of bits corresponding to more than one event type. In these embodiments, the routing of each bit or subset of bits may be independent to the routing of another bit or another subset of bits included in the received packet(s). For example, a first bit (or subset of bits) may correspond to a first event type and therefore master device 450 may determine to route the first bit to a first destination. However, a second bit (or subset of bits) may correspond to a second event type and therefore master device 450 may determine to route the second bit to a second destination, which may be different than the first destination.

If the event type associated with the received event information is an event notification for processing unit 452 of master device 450 (block 540), event polling controller 458 may forward the event information to processing unit 452 (block 545). In one specific example, the event notification may be an interrupt for processing unit 452.

If the event type associated with the received event information is a SIRQ (block 550), master device 450 may translate the received event information to a protocol associated with SIRQ and forward the event information to a device external to master device 450 via the SIRQ protocol (block 555). For example, the event information may be forwarded to PIC 32 of soutbridge 30 via SIRQ bus 413. Southbridge 30 may subsequently forward information associated with the event to CPU 11.

If the event type associated with the received event information is a DMA request (block 560), master device 450 may translate the received event information to a protocol associated with DMA requests and forward the event information to a device external to master device 450 via the DMA protocol (block 565). For example, the event information may be forwarded to DMAC 34 of soutbridge 30 via the LDRQ# lines 417 of bus 411 (i.e., an LPC bus). Southbridge 30 may subsequently forward information associated with the DMA event to CPU 11.

It is noted that the received event information may correspond to other event types besides DMA and SIRQ. Even if the event type is not a DMA request or a SIRQ, master device 450 may still be configured to translate the received event information to the protocol associated with the specific event type and forward the event information to a device external to master device 450 (block 570). It is further noted that the event information received from a particular slave device 425 may correspond to two or more event types, for example, the received event information may include both an interrupt for processing unit 452 and a DMA request.

In various embodiments, master device 450 may include a mapping mechanism (e.g., mapping tables and corresponding logic) for reading the received event information and determining the at least one event type associated with the event information. In some embodiments, the mapping mechanism may be included within the event polling controller 458. Master device 450 may determine where to forward the event information based on the at least one event type. In one specific implementation, slave devices 425 may be configured to send a single bit as the event information. For instance, in one example, an SIRQ event may be transmitted as a single bit event from a slave device 425, which is then mapped to an IRQ# (e.g., IRQ12) and translated to the SIRQ protocol in master device 450. It is noted, however, that in other instances the slave devices 425 may send two or more bits of event information to be mapped at master device 450.

In some embodiments, slave devices 425 may be configured to embed mapping information in the event information that is transmitted to master device 450. The mapping information included in the event message is indicative of the at least one event type corresponding to the event information. Master device 450 may be configured to read the event information (including the mapping information) to determine the at least one event type and also determine where to forward the event information. In one specific implementation, slave devices 425 may embed a 4-bit mapping indicator within the transmitted event information. For instance, in one example, a slave device 425 may forward a 4-bit map containing the number 12 in binary to indicate the specific IRQ#. In this example, master device 450 may detect the IRQ# and embed the IRQ# into the SIRQ protocol. It is noted, however, that in other instances the slave devices 425 may send two or more bits of event information including the mapping information.

It is noted, however, that in other embodiments, the in-band event polling mechanisms may implement both techniques described above for mapping the event information. Specifically, during operation, some event messages may include event information that is mapped in the master device, and other messages may embed the mapping information within the event message, depending on the needs of the application. It is further noted that in some embodiments the multi-bit event information corresponding to one or more event types may be transmitted via one or more packets.

In one embodiment, master device 450 may include a state machine including a programmable interval. The state machine may control the rate at which master device 450 issues poll requests. For example, in one embodiment, the state machine may continuously issue poll requests at a rate determined by a programmable register. By slowing down the rate, the interval may allow ordinary data cycles to occupy the bus.

When delivering event information (e.g., an interrupt) to master device 450, bus 455 may include a mechanism for interleaving event information from slave devices 425. For example, mapping tables may be used to map event signals to event types to dispatch the event signals to the appropriate destinations. Also, bus 455 may include a mechanism for clearing event requests if the embedded processor (or other entity) has performed an action that responds to the event.

If the event information is to be forwarded to a system bus that uses a framed serial interrupt request mechanism (e.g., SIRQ bus 413), then master device 450 may include a mechanism for assigning a slave device's interrupt request to a particular serial frame. Furthermore, a mechanism may be included to track updates to the frame number if that number is changed on a slave device 425.

As described above, processing unit 452 of master device 450 may issue typical data read and data write bus transactions to any of slave devices 425 connected to bus 455. In addition, event polling controller 458 of master device 450 may autonomously generate event polling cycles.

Figure 6A:
FIG. 6A is a diagram of one example of an event polling cycle, according to one embodiment.

One specific example of an event polling cycle is illustrated in FIG. 6A. In this example, the line labeled "Signal" may represent either data lines (for implementations that use the same wires for data transactions) or a Frame signal (for implementations that poll for event information on a Frame signal that is separate from the data lines). It is noted, however, that there may be other bus signals in addition to the signals discuss with reference to FIG. 6A. In the illustrated example, the "S" may represent the start cycle that indicates an event poll, and the "T" cycles may represent bus turnarounds, so that driving the signal wires can be done by the master and the slave devices in turn. As illustrated, in one specific implementation, the polling cycle may request one event status from each of two devices at a time; device 0 and 1 report their status on the two bus signal wires during one cycle, and devices 2 and 3 report their status on a second cycle. It is noted, however, that slave devices 425 may report the event status by various other methods besides the one shown above in the timing diagram. It is noted that similar techniques may be implemented to transfer other event information besides interrupts, such as DMA requests.

It is noted that in some embodiments other models may be implemented, particularly if there is more than one event signal to be polled. Each device may report status over multiple cycles, or it can use more than one bus signal wire at a time. In one embodiment, if there are many event signals to monitor, the event status reported in the poll cycle may signal not the state of an event but instead the state of a register on the slave device 425 that records events. If any bit has changed, the reported status goes active, and either the processing unit 452, or the event polling controller 458, may follow the poll cycle with a standard I/O read of the event status register on the slave device 425 to determine which event or events to flag.

Figure 6B:
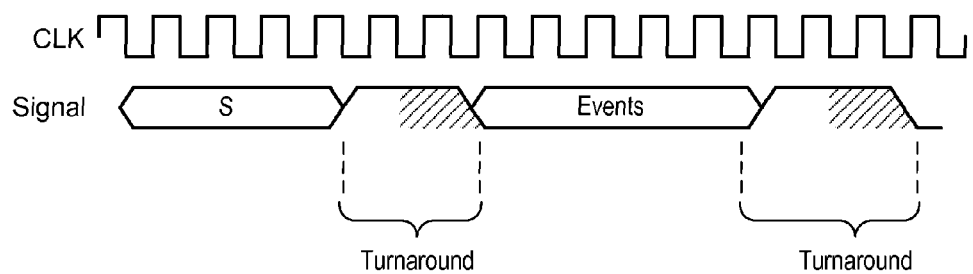
FIG. 6B is a diagram of another example of an event polling cycle, according to one embodiment.

FIG. 6B is another specific example of an event polling cycle. In this example, after the polling cycle "S" and the turnaround cycle "T", the slave device transmits five bits of asynchronous event information. As described above, the event information may either be mapped at the master device or the mapping information may be embedded in the five bits of the event message. It is noted that the number of bits in the event message may vary.

Figure 7A:
FIG. 7A is a diagram of one example of a read bus cycle including an event state, according to one embodiment.

In addition to the poll cycle described above, a mechanism may be required to track a slave device's event state as soon as possible after a read or write to a register on that slave device 425. This may be needed because such a read or write could cause the event to be de-asserted, and if the request is not turned off in time, processing unit 452 may interpret a subsequent event poll as a new, active event, rather than the flag of an old event that had already been processed. In one specific implementation, this may be avoided by incorporating a slave device's event status into the acknowledgement cycle of a bus read or write transaction. A specific example of a read bus cycle is shown in FIG. 7A. In FIG. 7A, the labels "S", "F", "C" may be cycles that identify this bus transaction as a data read. The "A" cycles may be the corresponding address in the slave device. The "D" cycles may be the data returned from the slave device. The "T" cycles may be a bus turnaround cycle, where the slave and master devices alternate driving the bus. The "R" cycle may be an acknowledge cycle, e.g., Ready, Done, Error, etc. The "I" cycle may indicate the event state as transmitted from slave device to master device.

In the example of FIG. 7A, there may be two data bits on the bus. The "I" cycle may transmit as many bits as required to indicate the state of all events that may need to be tracked (that is, it could last for more than one cycle). The "I" cycle may also include the state of any serial interrupt frame update.

Figure 7B:
FIG. 7B is a diagram of one example of a write bus cycle including an event state, according to one embodiment.

FIG. 7B illustrates a specific example of a write bus cycle. Note that the write bus cycle is similar to the read bus cycle, except that the "D" data cycles are driven from master device 450 to the slave devices 425.

Any of the embodiments described above may further include receiving, sending or storing instructions and/or data that implement the operations described above in conjunction with FIGS. 1-7B upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
   a first bus;
   a plurality of slave devices coupled to the first bus; and
   a master device comprising an event polling controller and an embedded processor, and coupled to the first bus, and configured to initiate a polling transaction over the first bus to poll at least a subset of the plurality of slave devices for event information used for conveying a plurality of distinct asynchronous event types;
   wherein, in response to the polling transaction, at least one of the at least a subset of the plurality of slave devices is configured to transmit first event information to the master device over the first bus, wherein the first event information corresponds to a first event type of the plurality of distinct asynchronous event types, and indicates an associated asynchronous event of the first event type in the at least one of the at least a subset of the plurality of slave devices;
   wherein the master device is configured to receive the first event information from the at least one of the at least a subset of the plurality of slave devices over the first bus, and determine where to forward the received first event information based on the first event type, wherein if the first event type is an event notification for the embedded processor, the event polling controller is configured to forward the received first event information to the embedded processor;
   wherein the first bus is configured to carry synchronous data transactions between the master device and the at least a subset of the plurality of slave devices.

2. The computer system of claim 1, wherein if the first event type is an event notification for a device external to the master device, the master device is configured to translate the received first event information to a protocol associated with the event type and forward the first event information to the external device.

3. The computer system of claim 1, wherein if the first event type is a SIRQ, the master device is configured to translate the received first event information to a protocol associated with SIRQ and forward the first event information to a device external to the master device.

4. The computer system of claim 1, wherein if the first event type is a DMA request, the master device is configured to translate the received first event information to a protocol associated with DMA and forward the first event information to a device external to the master device.

5. The computer system of claim 1, wherein the master device includes a mapping mechanism configured to read the received first event information and determine the first event type, wherein the master device is configured to forward the received first event information to one or more destinations based on the first event type.

6. The computer system of claim 1, wherein the received first event information includes mapping information indicative of the first event type, wherein the master device is configured to read the mapping information to determine the first event type and also determine where to forward the received first event information.

7. The computer system of claim 1, wherein the received first event information includes a plurality of data bits, wherein the plurality of data bits correspond to one or more of the plurality of distinct asynchronous event types, wherein the forwarding of a particular bit or a particular subset of bits to a particular destination is independent of the forwarding of another bit or another subset of bits.

8. The computer system of claim 1, wherein the first bus has a reduced pin count relative to an LPC (Low Pin Count) bus.

9. The computer system of claim 8, further comprising a second bus and a host processor, wherein if the first event type is an event notification for the host processor, the master device is configured to translate and forward the first event information to the host processor via the second bus.

10. The computer system of claim 9, wherein the second bus is an LPC bus.

11. The computer system of claim 1, wherein the plurality of slave devices are configured to transmit event information corresponding to the plurality of distinct asynchronous event types to the master device via a single bus and a single protocol.

12. The computer system of claim 1, wherein the rate at which the master device polls the at least a subset of the plurality of slave devices is programmable.

13. A method for event polling in a system including a master device coupled to a plurality of slave devices by a first bus, the method comprising:
- sending synchronous data transactions between the master device and one or more of the plurality of slave devices over the first bus;
- the master device polling at least a subset of the plurality of slave devices over the first bus for event information used for conveying a plurality of distinct asynchronous event types;
- in response to said polling, at least one of the at least one of the subset of the plurality of slave devices transmitting first event information to the master device over the first bus, wherein the first event information corresponds to a first event type of the plurality of distinct asynchronous event types, and indicates an associated asynchronous event of the first event type in the at least one of the at least a subset of the plurality of slave devices;
- the master device receiving the first event information transmitted by the at least one of the at least a subset of the plurality of slave devices over the first bus;
- the master device determining where to forward the received first event information based on the first event type; and
- the master device forwarding the received first event information to an embedded processor within the master device, if the first event type is an event notification for the embedded processor.

14. The method of claim 13, wherein if the first event type is a SIRQ, the master device translating the received first event information to a protocol associated with SIRQ and forwarding the first event information to a device external to the master device.

15. The method of claim 13, wherein if the first event type associated with the received event information is a DMA request, translating the received first event information to a protocol associated with DMA and forwarding the first event information to a device external to the master device.

16. A master device comprising:
- an embedded processor;
- a transmission mechanism configured to initiate a polling transaction to poll at least a subset of a plurality of slave devices over a first bus for event information used for conveying a plurality of distinct asynchronous event types, and further configured to send synchronous data transactions to one or more of the plurality of slave devices over the first bus; and
- an event polling controller configured to receive first event information transmitted by at least one of the at least a subset of the plurality of slave devices over the first bus in response to being polled for event information, wherein the first event information corresponds to a first event type of the plurality of distinct asynchronous event types, and indicates an associated asynchronous event of the first event type in the at least one of the at least a subset of the plurality of slave devices;
- wherein the event polling controller is configured to determine where to forward the received first event information based on the first event type; and
- wherein if the first event type is an event notification for the embedded processor, the event polling controller is configured to forward the received first event information to the embedded processor.

17. A computer system comprising:
- a host processor;
- a low pin count (LPC) bus coupled to a logic chipset;
- a master device coupled to the LPC bus and comprising an embedded processor;
- a second bus coupled to the master device, wherein the second bus has a reduced pin count relative to the LPC bus; and
- a plurality of slave devices coupled to the second bus;
- wherein the master device is configured to initiate a polling transaction to poll at least a subset of the plurality of slave devices for event information used for conveying a plurality of distinct asynchronous event types via the second bus, and is further configured to send synchronous data transactions to one or more of the plurality of slave devices over the second bus;
- wherein, in response to the polling transaction, at least one of the at least a subset of the plurality of slave devices is configured to transmit first event information to the master device via the second bus, wherein the first event information corresponds to a first event type of the plurality of distinct asynchronous event types, and indicates an associated asynchronous event of the first event type in the at least one of the at least a subset of the plurality of slave devices;
- wherein the master device is configured to receive the first event information from the at least one of the at least a subset of the plurality of slave devices and determine where to forward the received first event information based on the first event type;
- wherein if the first event type is an event notification for the embedded processor of the master device, the master device is configured to forward the received first event information to the embedded processor; and
- wherein if the first event type is an event notification for the host processor of the computer system, the master device is configured to translate the received first event information to a protocol associated with the first event type and forward the first event information to the host processor.

* * * * *